United States Patent Office 3,546,455
Patented Dec. 8, 1970

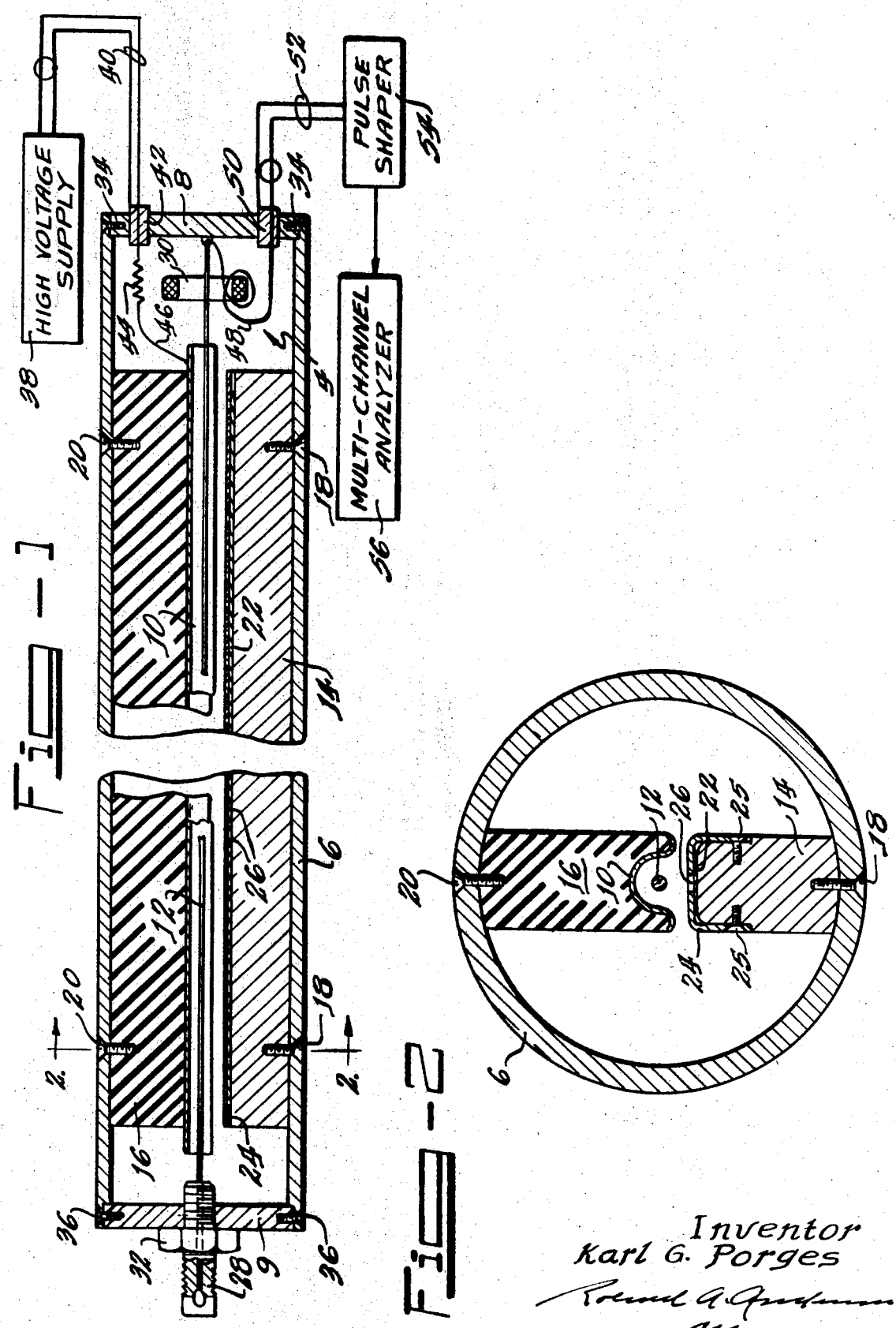

3,546,455
NEUTRON FLUX PLOTTING DEVICE
Karl G. Porges, Evanston, Ill., assignor to the United States of America as represented by the United States Atomic Energy Commission
Filed Jan. 28, 1969, Ser. No. 794,501
Int. Cl. G01t 3/00
U.S. Cl. 250—83.1      4 Claims

ABSTRACT OF THE DISCLOSURE

A spark chamber, placed in a flux of neutrons the spatial distribution of which is to be plotted, includes a pair of electrodes one of which is formed of a resistive wire. A high voltage supply is connected across the pair of electrodes to provide a potential difference therebetween. Disposed in the spark chamber are a fission foil for emitting fission fragments in response to receipt of neutrons, and a fission fragment collimator placed between the fission foil and the pair of electrodes and comprising a shield with holes cut therethrough for only passing fission fragments from the fission foil having a predetermined trajectory. One end of the resistive wire electrode is connected to a reference potential. The other end of the resistive wire electrode is connected to the same reference potential via a pulse coupling circuit including an output terminal. Pulses produced on the resistive wire electrode in response to spark discharges initiated by fission fragments passing the collimator each have an amplitude proportional to the position of the spark along the resistive wire electrode, and are coupled to a multichannel pulse height analyzer via the output terminal and the pulse coupling circuit.

CONTRACTUAL ORIGIN OF THE INVENTION

The invention described herein was made in the course of, or under, a contract with the United States Atomic Energy Commission.

BACKGROUND OF THE INVENTION

The present invention relates to devices for measuring the spatial distribution of nuclear radiation and in particular to a device for plotting the spatial distribution of a flux or neutrons.

Various devices exist at present to obtain neutron flux profiles. One such device comprises means for positioning foils in the neutron flux to be plotted and means for determining the amount of activation of each of the foils. In a nuclear reactor, use of such a device, while potentially very precise, requires two shutdowns; one for foil insertion and one for foil withdrawal. In addition, the time lag between acquisition and production of the flux profile is considerable, even where automatic counting equipment and computers are employed. Another flux profile plotting device comprises means for positioning a small radiation detector at various places of the nuclear radiation flux to be measured. Such a device requires elaborate means for mechanically positioning the detector, amplifying the detector output signal, and when used in a nuclear reactor, maintaining the reactor power constant during measurement of the flux.

It is therefore an object of the present invention to provide improved means receiving a flux of neutrons for plotting the spatial distribution thereof.

It is another object of the present invention to provide a device receiving a flux of neutrons for producing a fast and continuous output representative of the spatial distribution of said flux of neutrons.

It is still another object of the present invention to provide a device which is readily positioned in a channel of a nuclear reactor for measuring the spatial distribution of neutron flux therein.

SUMMARY OF THE INVENTION

The device of the present invention comprises a spark chamber including a pair of electrodes one of which is formed of a resistive wire, a fission foil disposed within the spark chamber for emitting fission fragments in the direction of the pair of electrodes in response to receipt of neutrons, a fission fragment collimator disposed between the fission foil and the pair of electrodes for only passing fission fragments having predetermined trajectories, and circuitry connected to the resistive wire electrode for coupling to pulse height measuring means pulses produced on the resistive wire electrode in response to spark discharges initiated by fission fragments passing the collimator.

BRIEF DESCRIPTION OF THE DRAWINGS

A more complete understanding of the invention will best be obtained from consideration of the accompanying drawings in which:
FIG. 1 is a schematic drawing illustrating a preferred embodiment of the present invention; and
FIG. 2 is an enlarged section on line 2—2 of FIG. 1,

PREFERRED EMBODIMENT OF THE INVENTION

Referring now to FIGS. 1 and 2, a spark chamber 4 comprises a cylindrical casing 6, of a material such as stainless steel, closed at both ends thereof by electrically conductive discs 8 and 9, and first and second mutually parallel electrodes 10 and 12. The spark chamber is filled with a gas, such as air at atmospheric pressure and room temperature.

Disposed within the casing 6 and along the length thereof are a source support bar 14, of a material such as stainless steel, secured to the casing by screws 18, and an electrically nonconductive bar 16, of a material such as ceramic, secured to the casing by screws 20.

Bar 14 supports parallel to the electrodes 10 and 12 a thin fission foil 22 comprising a strip of metal coated with fissionable material, such as $U^{235}$ for detecting a flux of thermal neutrons or $U^{238}$ for detecting a flux of fast neutrons. A fission fragment collimator 24, placed over the fission foil 22 parallel thereto and secured to the source bar 14 by screws 25, comprises a thin shield having a row of equally spaced holes 26 cut therethrough and along the length thereof.

The electrically nonconductive bar 16 has a U-shaped trough along the length thereof in which is pressed along the contour of the trough the electrode 10 consisting of a thin electrically conductive foil, preferably of a metal which resists spark erosion such as nickel-plated brass.

The second electrode 12 is a resistive wire, such as Nichrome or manganin wire. One end of the resistive wire electrode 12 is soldered to center-drilled screw 28 which rides in a slot in disc 9. The other end of the resistive wire electrode 12 passes through a ferrite core 30 and is secured to disc 8 such that by adjusting nut 32 on screw 28 in disc 9 the resistive wire electrode will be suspended along the axis of the U-shaped trough formed by the first electrode 10. Each end of the resistive wire electrode 12 is thus electrically connected to the casing 6 via discs 8 and 9 which are secured to the casing 6 by means of screws 34 and 36, respectively.

A lead 48, wound on the ferrite core 30 in a single turn, has one end thereof connected to the disc 8. The other end of lead 48 is connected to an output terminal 50 mounted on disc 8 and electrically insulated therefrom. The output terminal 50 is connected, via a coaxial cable 52 and a pulse shaper circuit 54, to a pulse height measuring means, such as a conventional multichannel analyzer 56.

The output of a high voltage supply 38 is connected to the electrode 10 via a coaxial cable 40, a connector 42, a resistor 44, and a lead 46. The casing 6, interconnected to the high voltage supply 38 via disc 8 and the outer conductor of coaxial cable 40, provides a ground or reference potential with respect to the potential on electrode 10.

For operation of the device, the spark chamber 4 is placed in an area where the neutron flux profile is to be detected and plotted, such as, for example, a channel of a nuclear reactor. The high voltage supply 38 is turned on causing the electrode 10 to casing 6 capacity, with insulating bar 16 as dielectric, to charge via resistor 44 to the constant output voltage of the high voltage supply, thereby providing a potential difference between the electrode 10 and the resistive wire electrode 12. Neutrons from the neutron flux being plotted entering the spark chamber 4 strike the fission foil 22 and produce fission fragments. However, only fission fragments traveling normal to the collimator 24 and the foil 22 towards holes 26 pass through the collimator. Fission fragments passing through the holes 26 of collimator 24 ionize the gas along their path. If the ionization of the gas along the path of a fission fragment is high enough in the vicinity of the resistive wire electrode 12, a spark is initiated through the ionized gas along the fission fragment path between the electorde 10 and the resistive wire electrode 12. When a spark occurs, the electrode 10 to casing 6 capacity will discharge. In particular, at the position of the spark along the resistive wire electrode 12 the electrode 10 to casing 6 capacity discharges in a current pulse which divides into two pulses traveling in opposite directions along the resistive wire electrode towards discs 8 and 9 of casing 6. Each pulse of the two pulses has an amplitude proportional to the ratio of the resistance value of the resistance wire electrode between the location of the spark and the end of the resistive wire electrode towards which the pulse is traveling and the total resistance value of the resistance wire electrode. The amplitude sum of the pair of current pulses is constant, since the electrode 10 to casing 6 capacity is charged to the same total charge between spark discharges by the constant output voltage of the high voltage suppply 38. The amplitude of the current pulse traveling thorugh the ferrite core transformer 30 towards disc 8 is thus directly proportional to the location of the spark along the resistive wire electrode 12, and hence to the position along the fission foil 22 where the neutron, causing the spark, was received. For example, the maximum amplitude of the discharge current pulse along electrode 12 through the ferrite core 30 occurs in response to a spark discharge closest to the end of the resistive wire electrode connected to disc 8. The minimum amplitude of a discharge current pulse along electrode 12 through the ferrite core 30 occurs in response to a spark discharge closest to the end of the resistive wire electrode 12 connected to screw 28 in disc 9.

Pulses induced in the winding of lead 48 on the ferrite core by discharge pulses traveling on the resistive wire electrode 12 in the direction of disc 8 are accumulated and stored by the multichannel analyzer 56 according to pulse height, via coaxial cable 52 and pulse shaper 54, thus providing a plot of the spatial distribution of the flux of neutrons along the line defined by fission foil 22.

During the deionization time of the spark chamber and the time required for the multichannel analyzer to store the incoming pulse, the electrode 10 to casing 6 capacity recharges via resistor 44 and the operation repeats for the next spark discharge initiated by a fission fragment produced by a neutron striking the fission foil 22 and having the required trajectory for initiating a spark as described hereinbefore.

The device can be operated in a second mode by removing the collimator 24. In this mode of operation, the potential difference between the electrode 10 and the resistive wire 12 is initially adjusted by varying the output of the high voltage supply 38 such that fission fragments emitted within a small solid angle $\phi$ about a line perpendicular to the fission foil 22 in response to receipt of a neutron by the foil 22 will initiate a spark, whereas fission fragments emitted outside this small angle in response to receipt of a neutron by the foil 22, as well as any other nuclear radiation, will fail to initiate a spark. The location of the spark is therefore again related to the position of a neutron striking the foil 22, however, the uncertainty in the position of a neutron striking foil 22 is proportional to the magnitude of the angle $\phi$. In the first mode of operation of the present device, the magnitude of the angle $\phi$ is reduced to a minimum by the collimator 24, since only fission fragments having trajectories perpendicular to the fission foil 22 are allowed to initiate a spark, thus reducing the uncertainty in the measurement of a neutron striking fission foil 22.

Satisfactory operation can be obtained with a device sized as follows. A resistive wire electrode having a diameter of 0.005 inch is placed parallel to the U-chaped electrode at a distance of 0.0625 inch. A collimator constructed of an aluminum strip of 0.050 inch thickness with a row of 0.010 inch diameter holes each 0.010 inch apart is placed directly over and in parallel with the fission foil. The fission foil is placed at a distance of 0.30 inch from the resistive wire electrode. For the dimensions given, the high voltage applied to the U-shaped electrode is approximately 4000 volts.

Persons skilled in the art will, of course, readily adapt the general teachings of the invention to embodiments other than the specific embodiment illustrated. Accordingly, the scope of the protection afforded the invention should not be limited to the particular embodiment shown in the drawings and described above, but shall be determined only in accordance with the appended claims.

The embodiments of the invention in which an exclusive property or privilege is claimed are defined as follows:

1. A device for producing an output representative of the spatial distribution of a flux of neutrons, comprising:
    a spark chamber including a pair of electrodes, one of said electrodes being a resistive wire and having an output end portion;
    means for applying a voltage between said electrodes;
    means disposed within said flux of neutrons for emitting responsive to neutron incidence theron a fission fragment traveling between said electrodes to initiate an electrical discharge therebetween along the path of travel of said fission fragment, said electrical discharge effecting a current pulse traveling along said resistive wire electrode, the resistivity of said resistive wire acting to reduce the amplitude of said current pulse according to the distance between said output end portion and the point at which said electrical discharge occurs; and
    means for measuring the relative amplitude of said current pulse at said output end portion.

2. The device according to claim 1 wherein said means disposed within said flux of neutrons comprises a fission foil disposed in parallel with said electrodes for emitting responsive to neutron incidence thereon fission fragments and collimator means disposed between said fission foil and said electrodes and parallel therewith, said collimator means comprising a shied with holes cut therethrough for only passing fission fragments from said fission foil having a predetermined trajectory.

3. The device according to claim 1 wherein said amplitude measuring means comprises a multichannel pulse height analyzer, a ferrite core coaxially placed about said resistive wire, and a lead wound on said ferrite core coupling to said multichannel analyzer said current pulses along said resistive wire.

4. A device receiving a flux of neutrons for plotting the spatial distribution thereof, comprising:
- a spark chamber, including a capacitive electrode for storing an electrical charge and a second electrode formed of a resistive wire having both ends thereof connected to a common ground potential and disposed in parallel to said capacitive electrode;
- high voltage supply means connected across said capacitive electrode and said reference ground potential for charging said capacitive electrode;
- a fission foil disposed within said spark chamber in parallel with said electrodes for emitting responsive to receipt of a neutron a fission fragment towards said electrodes to produce along its track between said electrodes a discharge path for said capacitive electrode;
- a collimator disposed between said fission foil and said electrodes and parallel therewith, said collimator comprising a shield with holes cut therethrough for only passing fission fragments from said fission foil having a trajectory perpendicular to said shield;
- a multichannel pulse height analyzer; and
- a ferrite core coaxially placed about said resistive wire, and a lead wound on said ferrite core and connected between said reference potential and said multichannel analyzer for coupling to said multichannel analyzer discharge current pulses traveling on said resistive wire towards one end thereof from said capacitive electrode through said discharge path.

References Cited

UNITED STATES PATENTS 3,029,342   4/1962   Reiffel _____ 250—83.1

JAMES W. LAWRENCE, Primary Examiner

D. L. WILLIS, Assistant Examiner

U.S. Cl. X.R.

250—83.6; 313—61